United States Patent Office 3,787,474
Patented Jan. 22, 1974

3,787,474
CROSS-LINKED POLYMERS
Peter Daniels, Sawbridgeworth, and Alexander Kennedy Sim, Falkirk, Scotland, assignors to Inveresk Research International, Musselburgh, Scotland
No Drawing. Filed Sept. 10, 1970, Ser. No. 71,274
Claims priority, application Scotland, Sept. 12, 1969, 45,168/69
Int. Cl. C07c 69/54, 141/02
U.S. Cl. 260—459      8 Claims

ABSTRACT OF THE DISCLOSURE

The invention relates to novel cross-linked polymers which, when administered to humans have the property of lowering and controlling the cholesterol level of the blood. The invention provides novel polymers which are derived from a polymerizable monomer containing a quaternary ammonium group cross-linked with a polyfunctional monomer containing two or more unsaturated groups.

---

This invention relates to cross-linked anion exchange polymers, more especially polymers which sequester bile acids in the intestine, reducing their reabsorption and thus decreasing their concentration in the enterohepatic circulation.

Cholestyramine, the insoluble chloride salt of a quaternary ammonium anion exchange resin, is such a commercially available pharmaceutical preparation which has found limited application in the lowering of blood lipid levels, especially the reduction of cholesterol in hypercholesterolaemia; the relief of pruritus associated with cholestasis; and the control of diarrhoea following ileal resection. It is however, an unpleasant smelling, insoluble and extremely unpalatable powder, and may cause gastrointestinal disturbances which makes it unsuitable for patients in poor health (Eastwood, M. A., Girdwood, R. A., Lancet, vol. II, 1170, Nov. 30, 1968).

Cholestyramine has been most extensively and successfully used in cases of biliary obstruction, (Datta, D. V., Sherbook, S; Gastroenterology, 1966, 50, 323), in which the reduction of the most distressing pruritus outweighs its unpleasantness, but in the treatment, or prevention, of atherosclerosis, its beneficial action is not so apparent and it has thus not gained wide acceptance as a hypercholesterolaemic-reducing agent (Brit. Med. J. 1, 629, March 1968).

Thus, there is a need for new products in this area which are odorless and generally more palatable than the cholestyramine type ion exchange resins.

It has now been found that the above disadvantages are avoided by using for the treatment of the conditions referred to a cross-linked polymeric form of a quaternized amine.

Accordingly the present invention provides, for therapeutic application, a cross-linked polymer or copolymer derived from a polymerizable monomer containing a quaternary ammonium group cross-linked with a polyfunctional monomer containing two or more unsaturated groups.

The invention also provides pharmaceutical compositions containing as active ingredient a cross-linked polymer according to the invention together with a pharmaceutically active carrier or diluent. The compositions may also contain additional therapeutic agents.

The preferred polymerizable monomer is a compound of the formula

in which formula A is a quaternary carboxylate ester or a pyridinium group, R is hydrogen; —CH₃; —COOX (in which X is hydrogen; —CH₃ or —C₂H₅) or —C₆H₅ and R₁ is hydrogen; —CH₃ or —CH₃COOX in which X is as defined above.

Examples of particularly suitable monomers are (1) 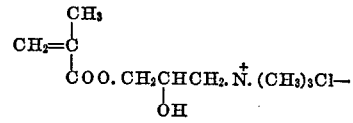

(2) 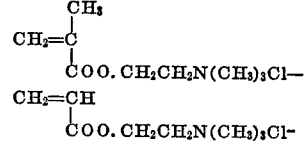

(3) 

Other compounds of this type represented by the general formula

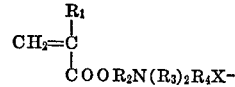

can be used. In the formula R₁ is H or CH₃; R₂ is —CH₂CH₂— or

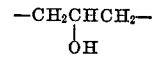

R₃ is CH₃— or C₂H₅—; R₄ is H, CH₃— or C₂H₅—; X⁻ is Cl⁻, Br⁻, I⁻ or CH₃SO₄⁻.

Quaternary ammonium compounds derived from vinyl pyridines such as 2-vinyl pyridine and 4-vinyl pyridine can also be used. A general formula for this class is

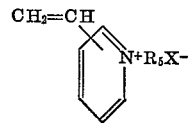

in which R₅ is CH₃—, C₂H₅— or C₃H₈; X⁻ is Cl⁻, Br⁻, I⁻ or CH₃SO₄⁻.

Quaternary ammonium compounds derived from maleic esters, fumaric esters, crotonic esters, cinnamic esters and itaconic esters can also be used.

Examples of suitable cross-linking agents are methylene bis acrylamide and ethylene glycol dimethacrylate.

Polymerization is carried out in the presence of a free radical catalyst, such as persulphates, hydrogen peroxide, sodium perborate and redox-type catalysts. Quaternization can take place before or after polymerization.

The polymer produced will contain from 0.1 to 20% by weight of the cross-linking agent.

The polymers according to the invention are effective in reducing blood cholesterol levels and show a comparable activity in this respect to cholestyramine.

The polymers are hydrophilic and compatible with water and swell in water to give gels or, by controlling particle size pourable suspensions can be produced. The hydrophilic nature of the polymer makes it suitable for combination with food and drink.

The polymers are odorless, can be purified easily and are of low toxicity.

Because of the cross-linked nature of the polymer absorption into the blood stream is minimal.

The invention is illustrated by the following examples. In the examples Quolac MER Q-1 is the compound of the formula

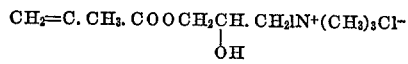

and Quolac MER Q-5 is the compound of the formula

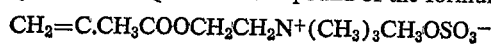

EXAMPLE 1

Methylenebisacrylamide (1.5 g.) was dissolved in 60 mls. water then Quolac MER Q-1

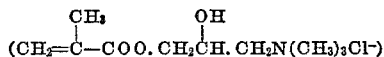

(15.0 g.) and ammonium persulphate (30 mg.) were added and the solution degassed with nitrogen. The solution was gently heated to 65° C. and gelation occurred after ½ hour. Stirring was stopped and the product left at this temperature for 2 hours. The gel was disintegrated using a Silversone high speed mixer and swollen with distilled water. The gel was washed several times with distilled water by a centrifugation technique. The product was dried in a vacuum oven over calcium chloride at 40° C.

Yield 12.0 g. (73%).

The properties of the cross-linked polymer can be controlled by varying its cross link density which will determine the degree of swell of the product.

In the following examples the abbreviations used have these meanings:

C=cross-linked
Q1=Quolac MER Q-1
Q5=Quolac MER Q-5
MBA=methylene bis acrylamide
EGDM=ethylene glycol dimethacrylate Thus CQ1/MBA/5 means a cross-linked polymer derived from Quolac MER Q-1 and 5%, by weight of Q-1, of methylene bis acrylamide.

EXAMPLE 2

The following proportions of Q-1 and MBA were dissolved in water (200-400 ml.). Ammonium persulphate (150 mg.) acted as initiator and after degassing with nitrogen the solutions were heated with shaking at 70° C. for 2 h. then 100° C. for 1 h.

| Q-1 (grams) | MBA (grams) | Polymer | Yield (grams) | Percent yield |
|---|---|---|---|---|
| 50 | 2.5 | CQ1/MBA/5 | 50.8 | 96.7 |
|  | 5.0 | CQ1/MBA/10 | 52.5 | 95.5 |
|  | 7.5 | CQ1/MBA/15 | 55.6 | 96.7 |
|  | 10.0 | CQ1/MBA/20 | 57.6 | 96.0 |

All the products gave stiff gels after ½ h. The gels were disintegrated with a Silversone high speed mixer and swollen in water. The gels were washed several times with water, being centrifuged at each stage. They were then dried in an oven at 60° C. and finally in a vacuum oven at 60° C.

The degree of swell of each product was determined:

Polymer:                        Degree of swell
    CQ1/MBA/5 ----------------------------- 35.4
    CQ1/MBA/10 ---------------------------- 20.8
    CQ1/MBA/15 ---------------------------- 45.2
    CQ1/MBA/20 ---------------------------- 31.7

EXAMPLE 3

The following proportions of Q-1 and EGDM were added to water (200 ml.), isopropanol (20 ml.) and ammonium persulphate (150 mg.).

Q-1 (g.):                        EGDM (g.)
    50 ------------------------------------- 4.0
    50 ------------------------------------- 8.5

After degassing, the polymerizations were carried out at 70° C. for 2 h., then 100° C. for 1 h. The products were then macerated, swollen in water then progressively dehydrated by alternatively treating with isopropanol (4 times the volume of the gel) and centrifuging. The products were dried in an oven at 60° C. then finally in a vacuum oven at 60° C.

The degrees of swell and yields were:

| Degree of swell | Polymer | Yield (grams) | Percent yield |
|---|---|---|---|
| 65.4 | CQ1/EGDM/8 | 51.0 | 94.4 |
| 41.2 | CQ1/EGDM/17 | 57.1 | 97.6 |

EXAMPLE 4

The following weights of Q-5 monomer and MBA crosslinking agent were dissolved in water, ammonium persulphate initiator (150 mg.) was added and after degassing, the solution was polymerized at 70° C. for 2 h., then 100° for 1 h.

Q-5 (g.):                        MBA (g.)
    50 --------------------------------------- 3
    50 --------------------------------------- 6
    50 --------------------------------------- 9

A solid gel was formed within 30 minutes. The gels were macerated in water and then packed in sintered glass funnels, when sodium chloride (100 g. in 2 liter water, 10 fold excess) was slowly passed through the packed funnel. This step was to convert the polymers into the chloride form. The gels were then washed with water until free of sodium chloride (negative flame test).

All samples were readily dried by spreading them out on trays and leaving them in an oven at 60° C. overnight.

Yields and degrees of swell are given.

| Yield (grams) | Polymer | Theoretical yield of chloride salt (grams) | Degree of swell |
|---|---|---|---|
| 42.5 | CQ5/MBA/6 | 36.7 | 23.2 |
| 47.2 | CQ5/MBA/12 | 39.7 | 12.5 |
| 50.3 | CQ5/MBA/18 | 42.7 | 9.0 |

EXAMPLE 5

The following weights of Q-5 monomer and EGDM crosslinking agent were added to water (200 ml.), isopropanol (20 ml.) and ammonium persulphate (150 mg.).

Q-5 (g.):                        EGDM (g.)
    50 --------------------------------------- 3
    50 --------------------------------------- 9

The solutions were degassed with nitrogen, then polymerization was effected at 70° C. for 2 h., and 100° C. for 1 h. Solid gels had formed within 30 minutes. The products were macerated in water and then packed in sintered glass funnels, when sodium chloride (200 g. in 4 l. water, ca. 20-fold excess) was slowly passed through the packed column. The gels were then washed until free of sodium chloride.

Both samples were readily dried at 60° C.

| Yield | Polymer | Degree of swell |
|---|---|---|
| 44.0 | CQ5/EGDM/6 | 45.7 |
| 46.0 | CQ5/EGDM/18 | 19.4 |

Polymers which have been found effective in binding bile acids in vitro have been shown to immobilize glycocholic acid in vivo (Merck. Bri. 929, 391).

The following experimental results show that the above preparation fulfils that criteria and compare favorably with cholestyramine on an equivalent dry weight basis.

IN VITRO TEST

Amounts of polymers equivalent to 50 mgs. dry material were placed in dialysis sacs of visking tubing 24/32" in diameter, knotted at one end. 5 ml. of water was added to the polymers in the sacs and the contents mixed. 5 mls. of sodium glycocholate solutions of various concentrations were then added to the mixtures in the sacs and the ends closed. Five sacs were prepared and the concentrations of glycocholate were such that the sacs contained 50, 75, 100, 125 and 150 mgs., respectively. A group of sacs was also prepared containing equivalent amounts of glycocholate but no polymer. The sacs were placed in vials containing 10 mls. water and the sealed vials shaken gently to equilibrate. After 24 hours, samples were removed from the solution outside the dialysis sac and the glycocholate concentrations determined by the following procedure.

1/10 dilutions were made of each of the samples. To 1 ml. aliquots of each sample, non-diluted and diluted, were added, 4 mls. of reagent sulphuric acid, prepared by diluting 42 mls. of conc. —$H_2SO_4$ with 24 ml. water. The resulting solutions were mixed thoroughly and heated in a water bath at 56° C. for 15 minutes. After cooling to room temperature the optical densities were measured at 318 m$\mu$ against a sulphuric acid reagent blank. All determinations were done in duplicate and the means calculated. From the optical density obtained for a standard solution containing 0.2 mg. sodium glycocholate/ml. concentrations, being directly proportional to the optical densities of the samples, were calculated.

TABLE 1

Effect of chloestyramine and of crosslinked resins according to the invention present in an amount of 0.35% of the diet of the hypercholesterolaemic chick

| Group treatment | Mean wt. gain (g.) | Serum cholesterol ±SE (mg. (percent) |
|---|---|---|
| Control | 151 | 230±7 |
| Cholestyramine | 158 | 178±4 |
| CQ1/MBA/5 | 170 | 148±4 |
| CQ1/MBA/10 | 165 | 140±3 |
| CQ1/MBA/15 | 162 | 179±9 |
| CQ1/MBA/20 | 163 | 165±6 |
| CQ1/EGDM/8 | 164 | 171±4 |
| CQ1/EGDM/17 | 170 | 186±8 |

What we claim is:

1. A cross-linked polymer derived from (a) a polymerizable monomer of the formula

| Original concentration glycocholate inside dialysis sac. (mg./10 ml. H$_2$O) | Final concentration glycocholate outside dialysis sac. (mg./10 ml. H$_2$O) | | | | |
|---|---|---|---|---|---|
| | No polymer | Cholestyramine | CQ5/MBA/6 | CQ5/MBA/12 | CQ5/MBA/18 |
| 50 | 2.61 | 0.13 | 0.22 | 0.20 | 0.17 |
| 75 | 3.33 | 0.38 | 0.37 | 0.42 | 0.45 |
| 100 | 4.44 | 1.67 | 0.83 | 1.25 | 1.50 |
| 125 | 4.84 | 1.78 | 1.80 | 2.42 | 2.86 |
| 150 | 6.94 | 3.61 | 3.22 | 3.55 | 4.50 |

| Original concentration glycocholate inside dialysis sac. (mg./10 ml. H$_2$O) | Final concentration glycocholate outside dialysis sac. (mg./10 ml. H$_2$O) | | | | | | |
|---|---|---|---|---|---|---|---|
| | No polymer | Cholestyramine | CQ1/MBA/5 | CQ1/MBA/5 | CQ1/MBA/10 | CQ1/MBA/15 | CQ1/MBA/20 |
| 50 | 2.35 | 0.15 | 0.26 | 0.21 | 0.19 | 0.26 | 0.21 |
| 75 | 3.40 | 0.43 | 0.40 | 0.34 | 0.35 | 0.43 | 0.43 |
| 100 | 4.42 | 0.88 | 0.76 | 0.79 | 0.92 | 1.03 | 1.09 |
| 125 | 5.21 | 1.71 | 1.61 | 1.52 | 1.82 | 2.24 | 2.54 |
| 150 | 5.82 | 3.05 | 3.22 | 3.12 | 3.40 | 3.79 | 3.94 |

| Original concentration glycocholate inside dialysis sac. (mg./10 ml. H$_2$O) | Final concentration glycocholate outside dialysis sac. (mg./10 ml. H$_2$O) | | | |
|---|---|---|---|---|
| | No polymer | Cholestyramine | CQ1/EGDM/8 | CQ1/EGDM/17 |
| 50 | 2.64 | 0.18 | 0.26 | 0.24 |
| 75 | 3.71 | 0.38 | 0.57 | 0.45 |
| 100 | 4.66 | 1.01 | 1.39 | 1.19 |
| 125 | 5.07 | 1.96 | 2.56 | 2.58 |
| 150 | 7.06 | 3.24 | 4.68 | 4.33 |

The following are in vivo results obtained to demonstrate the activity of polymers according to the invention in influencing serum cholesterol content in the blood of chicks on controlled diet.

EXPERIMENTAL PROTOCOL

One-day-old Warren cockerels are given a normal breeders diet for 7 days. They are then randomly assigned, on a weight basis, to groups of ten or twelve and placed on the experimental diets. After 14 days, the chicks are bled from a wing vein and serum cholesterol determined. The chicks are weighed at the beginning and end of the experiment and food consumption records are kept.

DIETS

The basal diet, given to the control group, contains casein, 17.5%; gelatin 10.0%; lard, 10.0%; maize starch, 25.0%; glucose 29.6%; cholesterol, 0.5%; vitamins and minerals to 100%. The experimental groups receive this diet with the resins at 0.1 to 0.5%. One group receives cholestyramine for comparison purposes.

The experimental results are set out in the following table.

in which A is —$COOR_2N$—$(R_3)_2R_4X$ in which $R_2$ is —$CH_2CH_2$— or $$-CH_2CHCH_2-\atop\phantom{xxx}|\phantom{xxx}\atop OH;$$

$R_3$ is $CH_3$— or $C_2H_5$—; $R_4$ is H, $CH_3$— or $C_2H_5$—; and X is $Cl^-$, $Br^-$, $I^-$ or $CH_3SO_4^-$; R is hydrogen or methyl; and $R_1$ is hydrogen or methyl and (b) from 0.1 to 20% by weight of a cross-linking monomer which is methylene bis acrylamide or ethylene glycol dimethacrylate.

2. A cross-linked copolymer derived from the polymerizable monomer of the formula

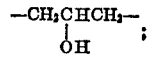

and 0.1 to 20% by weight of methylenebisacrylamide.

3. A cross-linked polymer derived from the polymerizable monomer of the formula

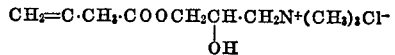

and 0.1 to 20% by weight of ethylene glycol dimethacrylate.

4. A cross-linked polymer derived from the polymerizable monomer of the formula $$CH_2=C.CH_3.COOCH_2CH_2N^+(CH_3)_3 CH_3OSO_3^-$$

and 0.1 to 20% by weight of methylene bis acrylamide.

5. A cross-linked polymer derived from the polymerizable monomer of the formula $$CH_2=C.CH_3COOCH_2CH_2N^+(CH_3)_3 CH_3OSO_3^-$$

and 0.1 to 20% by weight of ethylene glycol dimethacrylate.

6. A process for the production of cross-linked polymers derived from (a) a polymerizable monomer of the formula $$\begin{matrix} R & R_1 \\ | & | \\ CH=C \\ | \\ A \end{matrix}$$

in which A is $-COOR_2N-(R_3)_3R_4X$ in which $R_2$ is $-CH_2CH_2-$ or $$-CH_2CHCH_2- \\ \phantom{-CH_2}| \\ \phantom{-CH_2}OH$$ ;

$R_3$ is $CH_3-$ or $C_2H_5-$; $R_4$ is H, $CH_3-$ or $C_2H_5-$; and X is $Cl^-$, $Br^-$, $I^-$ or $CH_3SO_4^-$; R is hydrogen or methyl; and $R_1$ is hydrogen or methyl and (b) from 0.1 to 20% by weight of a cross-linking monomer containing methylene bis acrylamide or ethylene glycol dimethacrylate, which comprises heating the polymerizable monomer and the cross-linking monomer in an aqueous solvent or solvent mixture at least until polymerization occurs.

7. A process as claimed in claim 6 wherein the reaction is carried out in the presence of a free radical catalyst.

8. A process as claimed in claim 6 wherein the cross-linked polymer is subsequently converted into its chloride form.

References Cited
UNITED STATES PATENTS 3,144,391    8/1964    Goff _____ 167—87.2

LORRAINE A. WEINBERGER, Primary Examiner

P. J. KILLOS, Assistant Examiner

U.S. Cl. X.R.

260—294.85, 295 Q, 295 R, 477, 482 R, 485 J, 485 H, 486 R; 424—78, 81